(12) United States Patent
Chang et al.

(10) Patent No.: US 7,336,658 B2
(45) Date of Patent: Feb. 26, 2008

(54) METHODS AND SYSTEM OF VIRTUAL CIRCUIT IDENTIFICATION BASED ON BIT PERMUTATION OF LINK NUMBERS FOR MULTI-STAGE ELEMENTS

(75) Inventors: Ho-Yen Chang, Raleigh, NC (US); Tyan-Shu Jou, Apex, NC (US); Ritesh Ahuja, Rockville, MD (US); James da Silva, Rockville, MD (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 730 days.

(21) Appl. No.: 10/033,039

(22) Filed: Jan. 2, 2002

(65) Prior Publication Data
US 2003/0074468 A1 Apr. 17, 2003

Related U.S. Application Data

(60) Provisional application No. 60/271,973, filed on Feb. 28, 2001.

(51) Int. Cl.
*H04L 12/00* (2006.01)

(52) U.S. Cl. ....................................... 370/388; 709/238

(58) Field of Classification Search ................ 370/388, 370/395.3, 395.2, 369, 370, 372; 709/238
See application file for complete search history.

(56) References Cited

U.S. PATENT DOCUMENTS

| | | | | |
|---|---|---|---|---|
| 5,260,934 A | * | 11/1993 | Tanaka et al. | 370/395.41 |
| 5,689,506 A | * | 11/1997 | Chiussi et al. | 370/388 |
| 6,052,373 A | * | 4/2000 | Lau | 370/399 |
| 6,122,274 A | * | 9/2000 | Kumar | 370/388 |
| 6,304,639 B1 | * | 10/2001 | Malomsoky et al. | 379/112.04 |
| 2001/0047409 A1 | * | 11/2001 | Datta et al. | 709/224 |
| 2002/0083195 A1 | * | 6/2002 | Beshai et al. | 709/238 |

* cited by examiner

*Primary Examiner*—Min Jung

(57) ABSTRACT

A method and system of assigning paths through an interconnection network (100) consisting of a plurality of switching elements (102:165) and a plurality of links coupling the switching elements (102:165) are provided. Physical restrictions of the interconnection network (100) are used to arrive at a logical representation of an architecture of the interconnection network (100). Traffic patterns of the interconnection network (100) are determined to balance the data traffic through the links coupling the switching elements (102:165). The logical representation and traffic patterns of the interconnection network (100) are used to setup virtual channel identifiers that determine paths through the switching elements and links so that data traffic is more evenly distributed through the interconnection network (100).

33 Claims, 15 Drawing Sheets

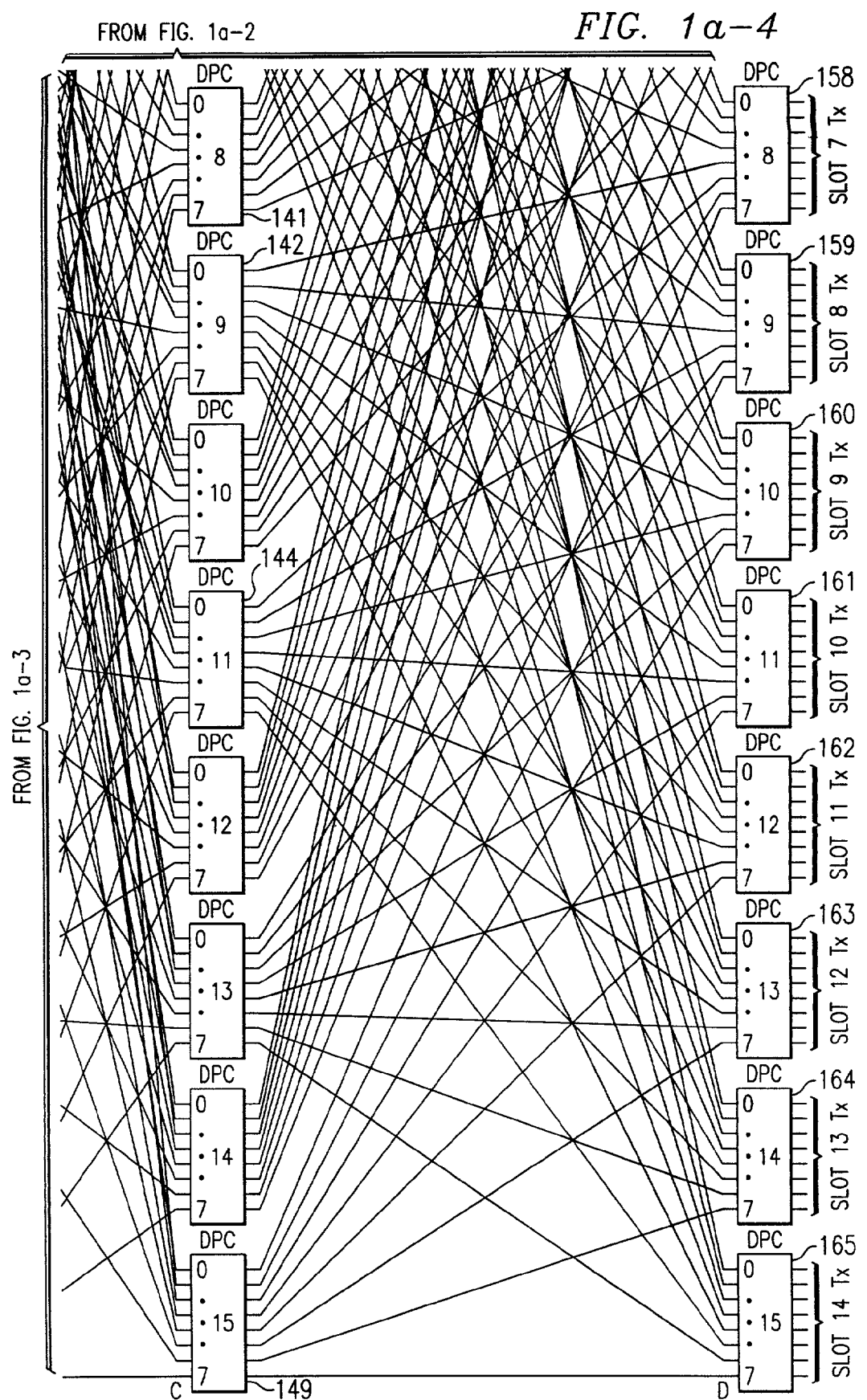

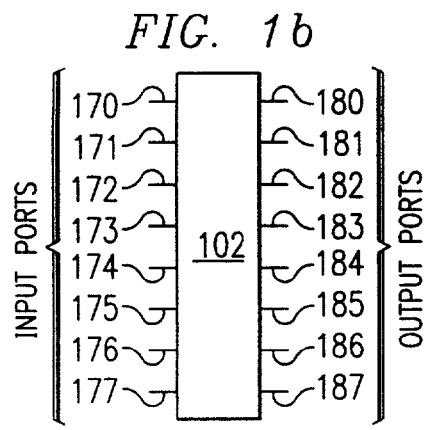
FIG. 1b
FIG. 1c
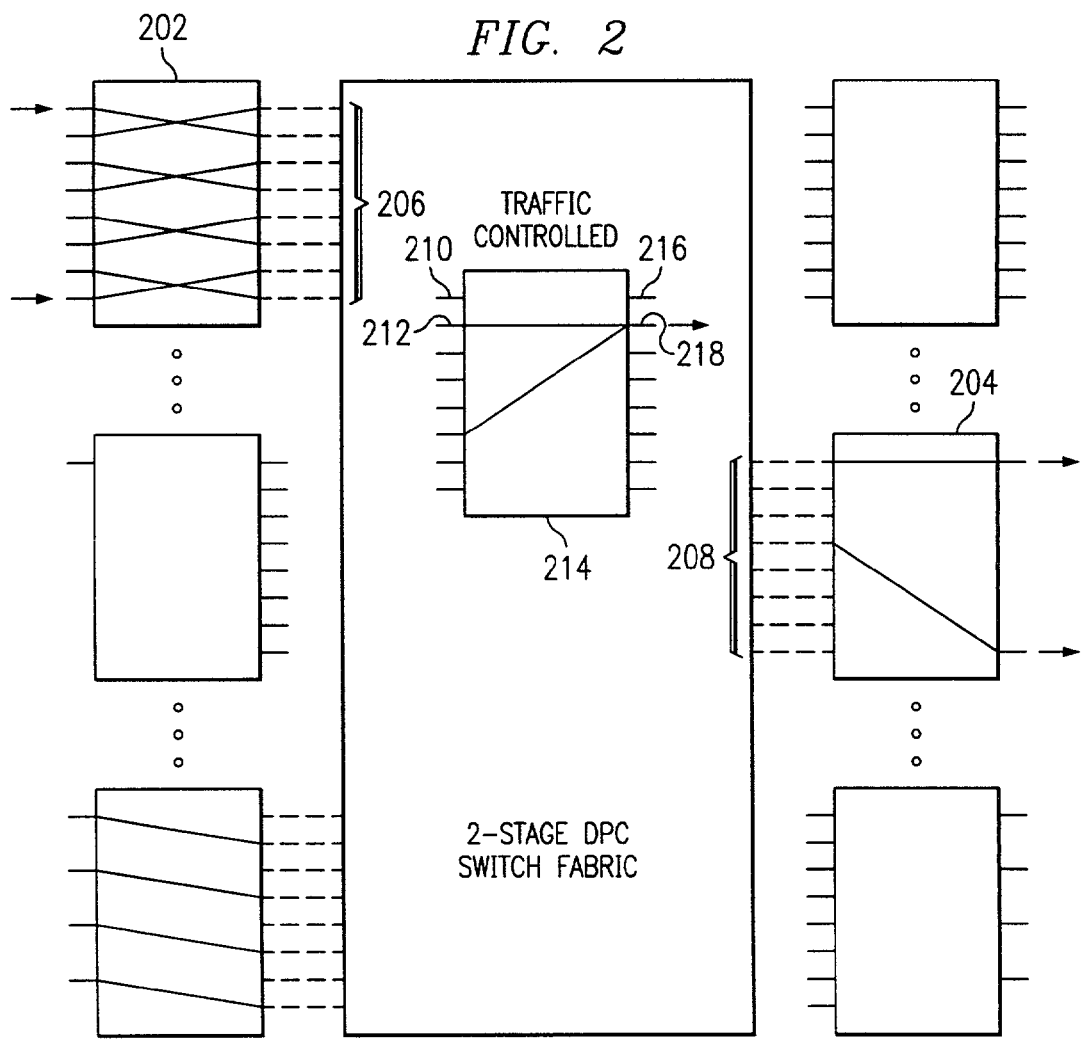
FIG. 2

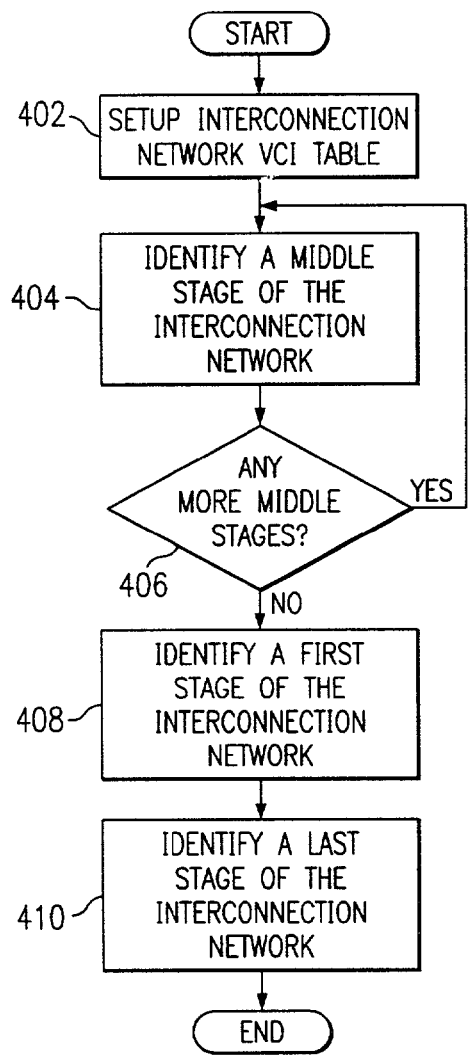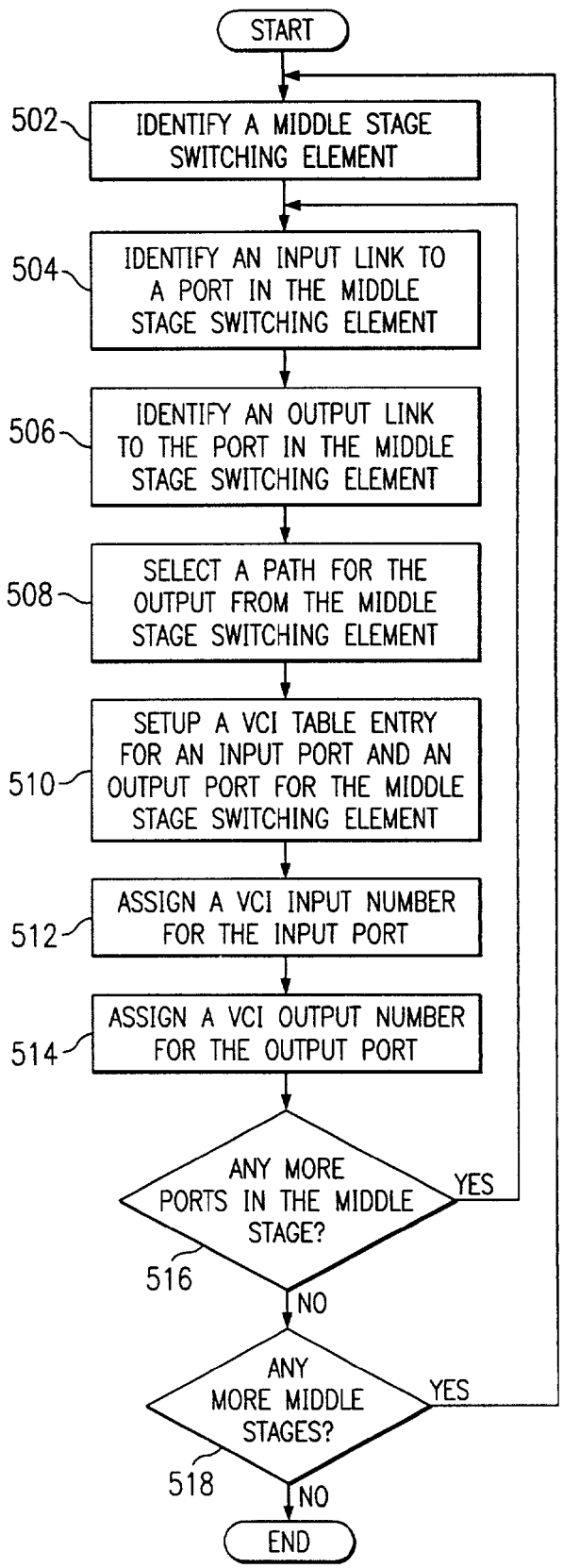

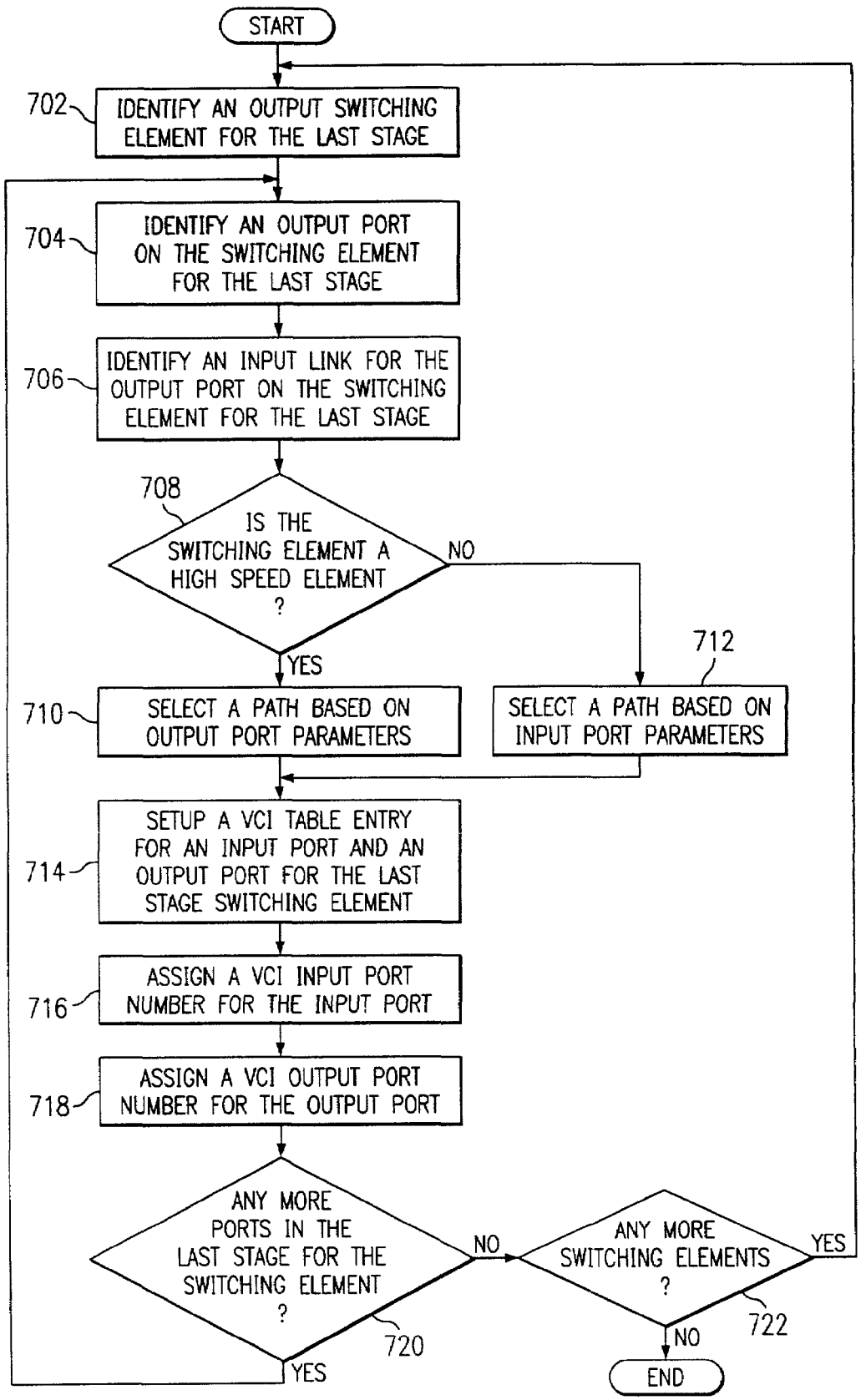

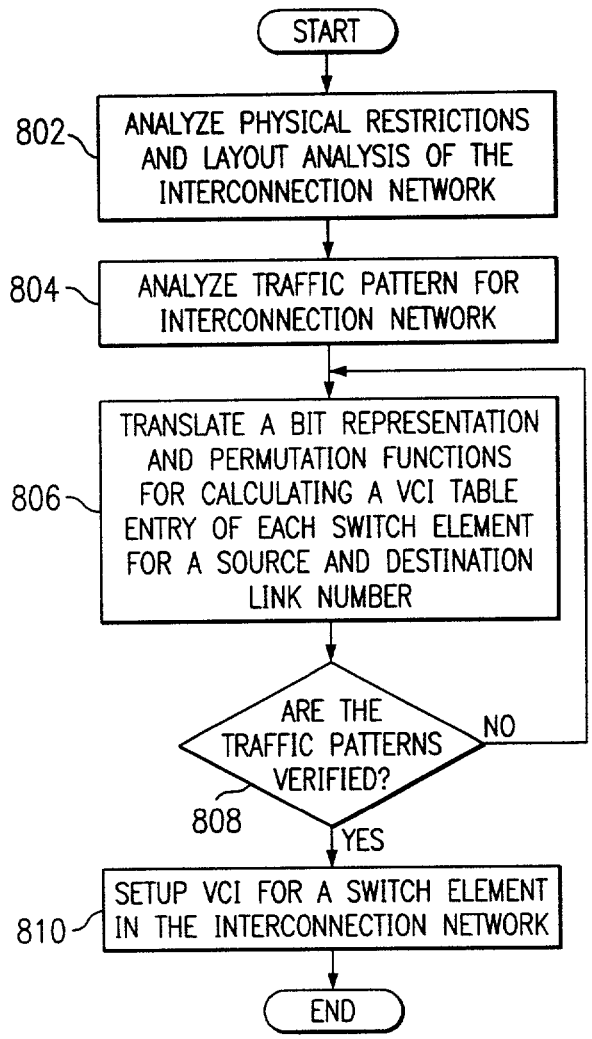
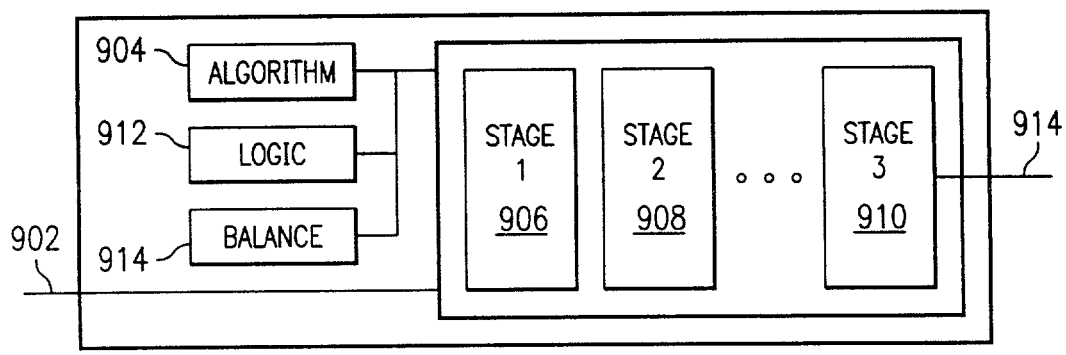

```
STAGE[0] :: fs
input  = (i[6],i[5],i[4],i[3]): (i[2],i[1],i[0]) — (j[6],j[5],j[4],j[3],j[2],j[1],j[0])
              ↓
output = (i[6],i[5],i[4],i[3]):
STAGE[1] :: ms1
input  =
output =
STAGE[2] :: ms2
input  =
output =
STAGE[3] :: ls
input  = (j[6],j[5],j[4],j[3]):
              ↑
output = (j[6],j[5],j[4],j[3]): (j[2],j[1],j[0]) — (i[6],i[5],i[4],i[3],i[2],i[1],i[0])
```

FIG. 10a

```
STAGE[0] :: fs
input  = (i[6],i[5],i[4],i[3]): (i[2],i[1],i[0]) — (j[6],j[5],j[4],j[3],j[2],j[1],j[0])
output = (i[6],i[5],i[4],i[3]):
STAGE[1] :: ms1        ③        ①
input  = (i[3], a, b, c) : (i[6],i[5],i[4]) —
         ②   ↓     ↓
output = (i[3], a, b, c) :
STAGE[2] :: ms2        ④
                  ⑥  ③
input  = (c, d, e, j[6]) : (i[3], a, b) —
         ⑤  ↓     ↓
output = (c, d, e, j[6]) :
STAGE[3] :: ls
                      ①         ⑦
input  = (j[6],j[5],j[4],j[3]) : (c, d, e) —
output = (j[6],j[5],j[4],j[3]): (j[2],j[1],j[0]) — (i[6],i[5],i[4],i[3],i[2],i[1],i[0])
```

FIG. 10b

{
STAGE[0] :: fs
input  = (i[6],i[5],i[4],i[3]): (i[2],i[1],[0]) − (j[6],j[5],j[4],j[3],j[2],j[1],j[0])
output = (i[6],i[5],i[4],i[3]): (a, b, c) −
STAGE[1] :: ms1
input  = (i[3], a, b, c) : (i[6],i[5],i[4]) −
output = (i[3], a, b, c) : (d, e, j[6]) −
STAGE[2] :: ms2            ⑧
input  = (c, d, e, j[6]) : (i[3], a, b) −
output = (c, d, e, j[6]) : (j[5],j[4],j[3]) −
STAGE[3] :: ls              ⑧
input  = (j[6],j[5],j[4],j[3]): (c, d, e) −
output = (j[6],j[5],j[4],j[3]): (j[2],j[1],j[0]) − (i[6],i[5],[4],i[3],i[2],i[1],i[0])
}

*FIG. 10c*

{
STAGE[0] :: fs
input  = (i[6],i[5],i[4],i[3]): (i[2],i[1],[0]) − (j[6],j[5],j[4],j[3],j[2],j[1],j[0])
output = (i[6],i[5],i[4],i[3]): (a, b, c) −
STAGE[1] :: ms1
input  = (i[3], a, b, c) : (i[6],i[5],i[4]) −
output = (i[3], a, b, c) : (d, e, j[6]) −
STAGE[2] :: ms2
input  = (c, d, e, j[6]) : (i[3], a, b) −
output = (c, d, e, j[6]) : (j[5],j[4],j[3]) −
STAGE[3] :: ls
input  = (j[6],j[5],j[4],j[3]): (c, d, e) −
output = (j[6],j[5],j[4],j[3]): (j[2],j[1],j[0]) − (i[6],i[5],[4],i[3],i[2],i[1],i[0])
}

*FIG. 10d*

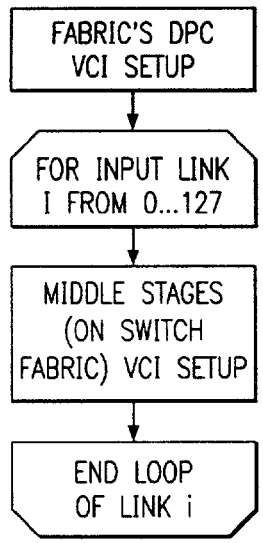
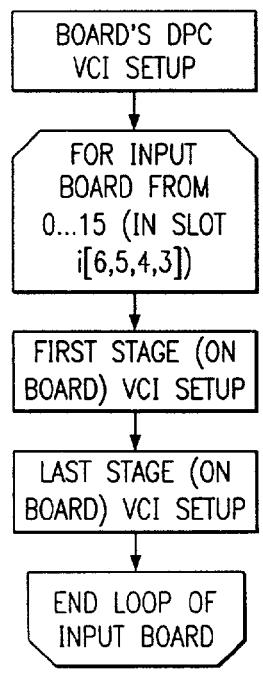
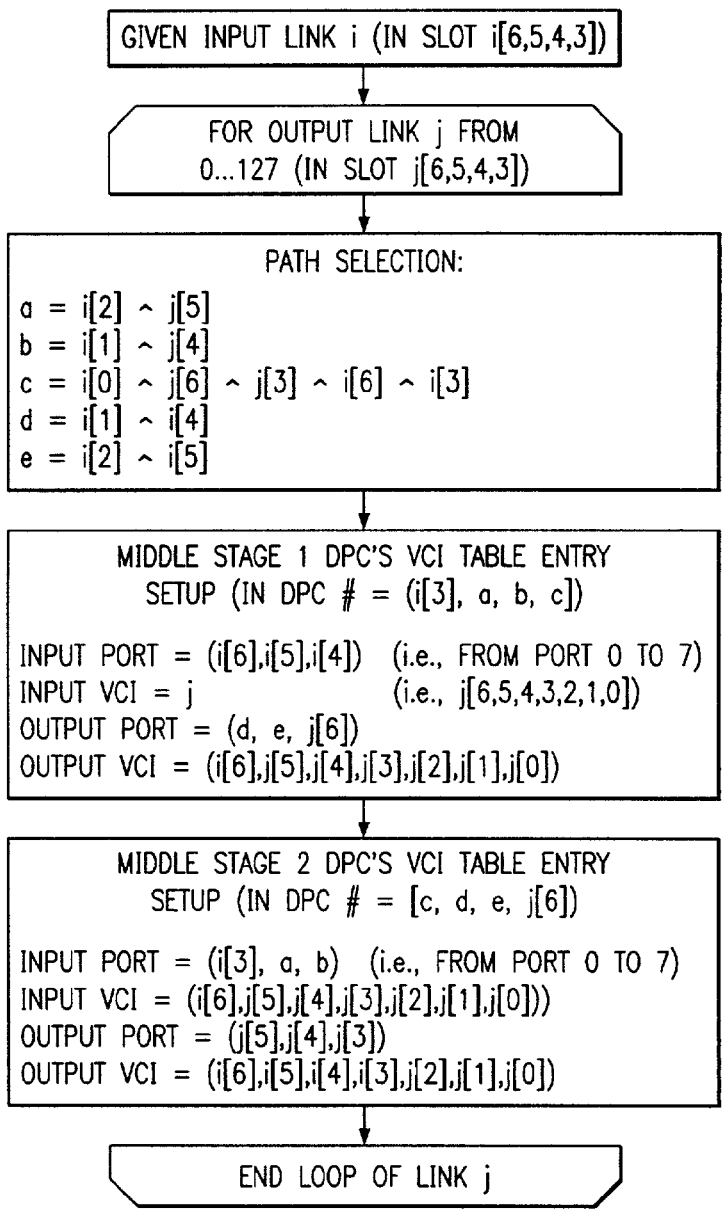

METHODS AND SYSTEM OF VIRTUAL CIRCUIT IDENTIFICATION BASED ON BIT PERMUTATION OF LINK NUMBERS FOR MULTI-STAGE ELEMENTS

CROSS REFERENCE TO RELATED APPLICATIONS

This application is related to Provisional Application Ser. No. 60/271,973 entitled "VCI ALLOCATING SCHEME BASED ON BIT PERMUTATION OF LINK NUMBERS FOR MULTI-STAGE ELEMENTS" by Ho-Yen Chang, Tyan-Shu Jou, Ritesh Ahuja, and James da Silva, filed Feb. 28, 2001, the entirety of which is incorporated herein by reference. This application claims priority on the aforementioned related provisional application.

TECHNICAL FIELD

The present invention relates generally to a data networks and, more specifically, to the assigning of circuit pathways between nodes of a data network. Still more specifically, the invention relates to a virtual circuit identification allocating system based on bit permutations of link numbers for multi-stage elements in which an assignment of virtual circuit pathways between switching elements maximizes utilization and throughput of network resources.

BACKGROUND OF THE INVENTION

Data networks use an assortment of switches, routers and traffic links to distribute the transmission of data. Oftentimes, the switches and routers employ interconnection networks consisting of multi-staged asynchronous transfer mode (ATM) switching elements to provide fast speed and high bandwidth data transmission capabilities. A challenge in such systems is to assign a virtual circuit path or a virtual circuit identification (VCI) mapping to each switching element to maximize the utilization and throughput of the interconnection network and to satisfy any specific traffic pattern requirements for the network overall. For example, a path conflict may occur within an interconnection network. Such conflicts can occur when input traffic from two different input source ports uses the same physical path on one data path controller (DPC) to two different output destination ports. A conflict means that these two traffic paths cannot be utilized simultaneously to provide full bandwidth.

In one known router configuration, the router has 128 input ports that act as points of "ingress" and 128 destination ports or ports on the "egress" of the router. From the ingress side to the egress side of the router, distribution of the data is often allocated such that the data is transmitted arbitrarily and so that the data traffic is heavier on certain paths. This often results in a bottleneck of the data within the router. Compounding this problem is the inclusion of switching elements with varying data transmission speeds. These switching elements may require that data be split into various multiple paths for proper operation.

For example, with many modern-day router system architectures, data is routed using an allocation scheme that supports single-port high speed switching elements from multiple ports off a multi-port board. Thus, data traffic from all the ports of a low speed board has to be aggregated to a single high speed board by multiple paths in parallel without conflicts. Similarly, traffic from a high speed switching element may be deaggregated into multiple ports for a given low speed board. To support communications between two high speed switching elements, the traffic has to be split evenly into smaller multiple paths or "stripes" and sent to multiple ports in a first stage. Through multiple non-conflict paths, which are preallocated in the interconnection network, traffic must then be aggregated in a last stage to a desired output port. Dividing and reassembling the data into the required multiple paths for the various boards can lead to conflicts in the routing of the data which can result in severe congestion.

Therefore, what is needed are a method and system in which traffic between a source and a destination is evenly transmitted between stages in the interconnection network so that no conflict arises from the transmission of data.

SUMMARY OF THE INVENTION

The present invention provides a method and system for a VCI allocation scheme based on bit representations and bit permutations of link numbers. This scheme may be expanded to any multi-stage ATM switching interconnection network with varying numbers of stages and with varying physical layouts.

According to one embodiment, disclosed is a method of assigning paths through an interconnection network consisting of a plurality of switching elements and a plurality of links coupling the switching elements. The method comprises the step of using physical restrictions of the interconnection network to arrive at a logical representation of an architecture of the interconnection network. Next, traffic patterns of the interconnection network are determined to balance the data traffic through the plurality of links coupling the switching elements. The logical representation and traffic patterns of the interconnection network are used to setup virtual channel identifiers that determine paths through the switching elements and links so that data traffic is more evenly distributed through the interconnection network.

According to one embodiment, the method includes the steps of mapping the interconnection network with a virtual circuit identifier and using the virtual circuit identifier to assign a path for data through the interconnection network from an input port to an output port.

According to another embodiment, the method of assigning paths through an interconnection network comprises the step of mapping the interconnection network to a table of virtual circuit identifiers wherein the virtual circuit identifiers include the physical restrictions and traffic patters of the interconnection network. Next, the virtual identifiers are used to assign a path for data through the interconnection network from an input port to an output port of the interconnection network. In one embodiment, the physical restrictions within the virtual circuit identifiers are based on the speed of the switching elements in the interconnection network. In another embodiment, the physical restrictions include the number of states of the interconnection network. Still other embodiments include virtual circuit identifiers where physical restrictions are based on the number of switching elements in each stage of the interconnection network, the number of ports for each switching element in the interconnection network, and the number of links between each input port and each output port in the interconnection network.

Further disclosed is a system for routing data in a data communications network. The system comprises a switching network including a plurality of switching elements and a plurality of links coupled to the switching elements for providing one or more routing paths for data as it enters the ingress side of the switching network and exits the egress side of the switching network. The system also includes a virtual circuit identification algorithm in communication with the switching network for providing even distribution of data traffic through the switching network. In one embodiment the switching network is arranged so that groups of switching elements are organized into stages. In another embodiment the virtual circuit identification algorithm includes logic for deriving the architecture of the switching network using the physical restrictions of the switching network. In still another embodiment, the switching network comprises logic for balancing data traffic through the plurality of links using the traffic patterns of the switching network.

The invention provides numerous advantages including the even distribution of data traffic as it traverses the interconnection network.

Another advantage of the invention is support of switching elements of various port speeds, with data traffic more evenly distributed as data is aggregated or deaggregated to accommodate both high and low speed ports.

BRIEF DESCRIPTION OF THE DRAWINGS

Other aspects of the invention, including its advantages and specific embodiments, are understood by reference to the following detailed description in conjunction with the appended drawings in which:

FIGS. 1a and 1b illustrate the physical layout of an interconnection network in which the invention can be employed;

FIG. 1c illustrates an architecture of a virtual circuit identification (VCI) table corresponding to the interconnection network in FIGS. 1a and 1b;

FIG. 2 illustrates a path conflict within an interconnection network such as the interconnection networks of FIGS. 1a and 1b;

FIG. 4 is an exemplary flowchart illustrating a multi-stage VCI setup in accordance with the present invention;

FIG. 5 is an exemplary flowchart illustrating the VCI set up for a middle stage in accordance with the present invention;

FIG. 7 is an exemplary flowchart illustrating a last stage VCI setup in accordance with the present invention;

FIG. 8 is an exemplary flowchart illustrating development of a VCI allocation for different traffic requirements in accordance with the present invention; and FIG. 9 is an exemplary block diagram showing the use of the present invention in an interconnection network;

FIGS. 10(a), 10(b), 10(c), and 10(d) show the steps to apply the physical restriction to a specific example algorithm using bit permutation and assignments according to the invention;

FIG. 11 illustrates the VCI setup algorithm applied to a specific router configuration; and FIGS. 12, 13, and 14 show the VCI setup process of the present invention in different stages.

References in the detailed description correspond to like references in the figures unless otherwise indicated.

DETAILED DESCRIPTION OF PREFERRED EMBODIMENTS

While the making and using of various embodiments of the present invention are discussed in detail below, it should be appreciated that the present invention provides many applicable inventive concepts which can be embodied in a wide variety of specific contexts. For example, while the invention is described in connection with a switching network consisting of four stages, it should be understood that the invention may be practiced with any multi-stage switching network with differing numbers of stages and various configurations.

Figures 1, 1A:
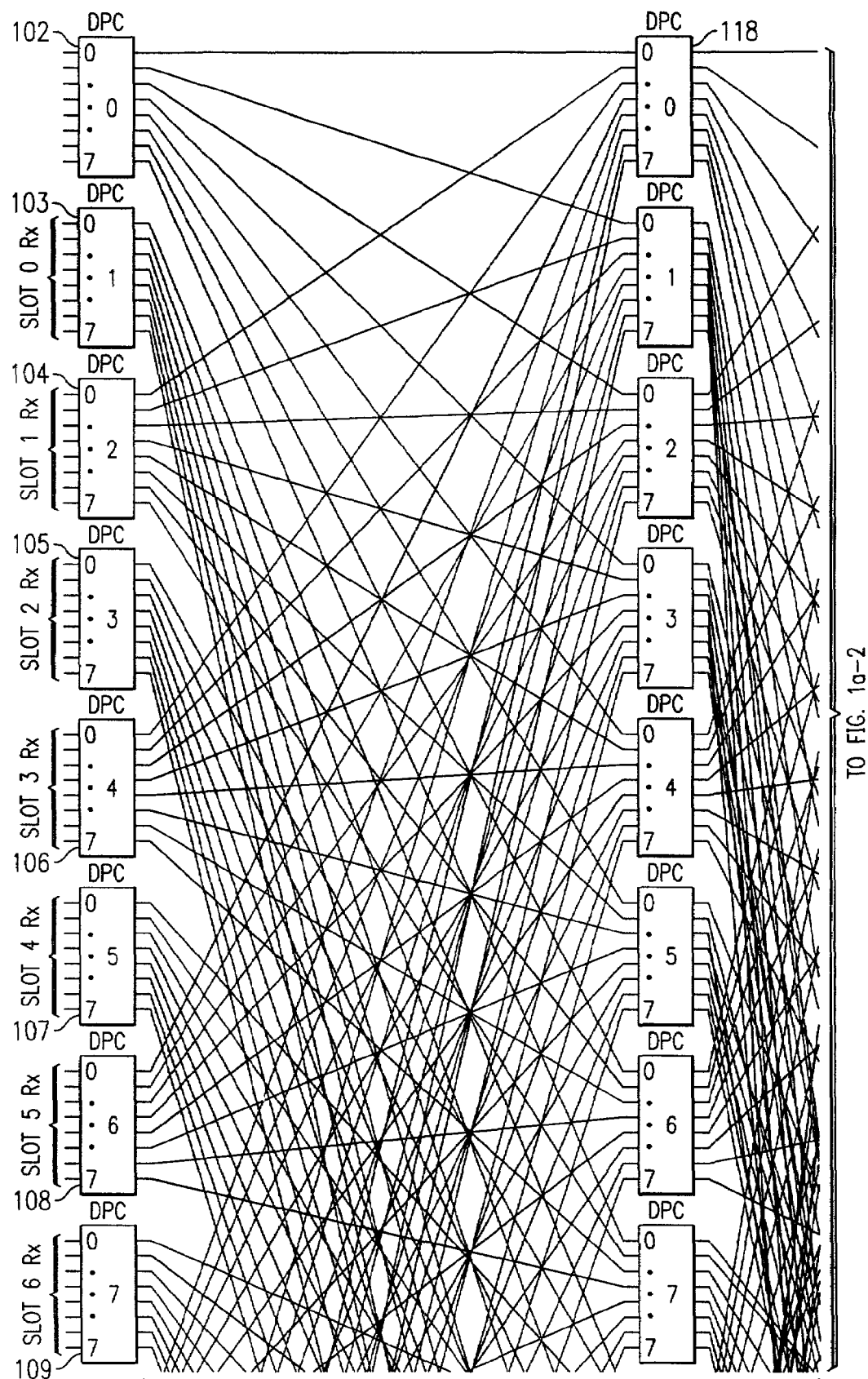

To better understand the invention, reference is made to FIGS. 1a and 1b which illustrates an example of a physical layout of an interconnection network. Interconnection network 100 is representative of switching elements in a data communications network, such as, for example, an ATM network. For this reason, the interconnection network 100 can be thought of as a "switching network" in function, and the terms shall be used interchangeably throughout.

In this example, interconnected network 100 consists of switching elements 102:165, numbered consecutively. These switching elements 102:165 are divided up into stages, for example, stages A, B, C and D. Switching elements 102:117 are in stage A, switching elements 118:133 are in stage B, switching elements 134:149 are in stage C, and switching elements 150:165 are in stage D. Main components of a switching element, for example, switching element 102, are a pair of elements called a data path (DP) and a data path controller (DPC). Each switching element 102:165, in this example, supports eight input ports 170:177 and eight output ports 180:187, as shown in FIG. 1b. It will be understood that the diagrams shown and described in FIGS. 1a and 1b are intended to be representative of the data routing systems in which the invention can be utilized and not a particular physical structure to which the invention is limited.

FIG. 1c illustrates an architecture of a virtual circuit identification table corresponding to the interconnection network 100 of FIGS. 1a and 1b. Each switching element contains a VCI table of 8192 entries or 1024 entries for each input port for an eight port board as shown in FIGS. 1a and 1b. A 13 bit index (0 to 8191) of the VCI table is a concatenation of a three bit internal port number (0 to 7) and a least significant ten bits of an incoming VCI number (0 to 1023). Therefore, at least 1024 VCIs may be supported for each input port 170:177 as shown in FIG. 1b.

As stated above, interconnection switching network 100 consists of four stages A-D of 16 switching elements as shown in FIG. 1a. All switching elements with an even number in stage A (e.g., 102, 104, 106, 108, 110, 112, 114, and 116) are connected to the eight top half (e.g., 118, 119, 120, 121, 122, 123, and 124) of the sixteen switching elements in stage B and all switching elements with an odd number in stage A (e.g., 103, 105, 107, 109, 111, 113, 115, and 117) are connected to the eight bottom half (e.g., 124, 125, 126, 127, 128, 129, 131, and 133) of the sixteen switch elements in stage B. Furthermore, all switching elements with an even number in stage B (e.g., 118) are connected to the eight top half (e.g., 134) of the sixteen switch elements in stage C and all switching elements with an odd number in stage B (e.g., 119) are connected to the eight bottom half (e.g., 142) of the sixteen switch elements in stage C. The interconnections between stage C and stage D follow the same procedure with stage D being the destination points in the interconnection network 100.

The collection of destination points of the interconnection network 100 is also referred to as the "egress" side of the interconnection network 100. Likewise, the input ports of stage A from the "ingress" side of the board in which the interconnection network 100 is implemented. DP and DPC pairs of stage A and last stage D, are on switching elements and stages B and C pairs are on the interconnection network 100. The interconnection arrangement shown in FIG. 1a is only an example and other interconnection configurations may be used. For example, the even numbered switching elements of one stage may be linked to the bottom switching elements of the subsequent stage or the even number switching elements may be linked to only odd numbered switching elements of the subsequent stage. In specific arrangements, the interconnection network 100 is made up of 8 slots with three stages or 32 slots with five stages.

Figures 1, 1A, 2:
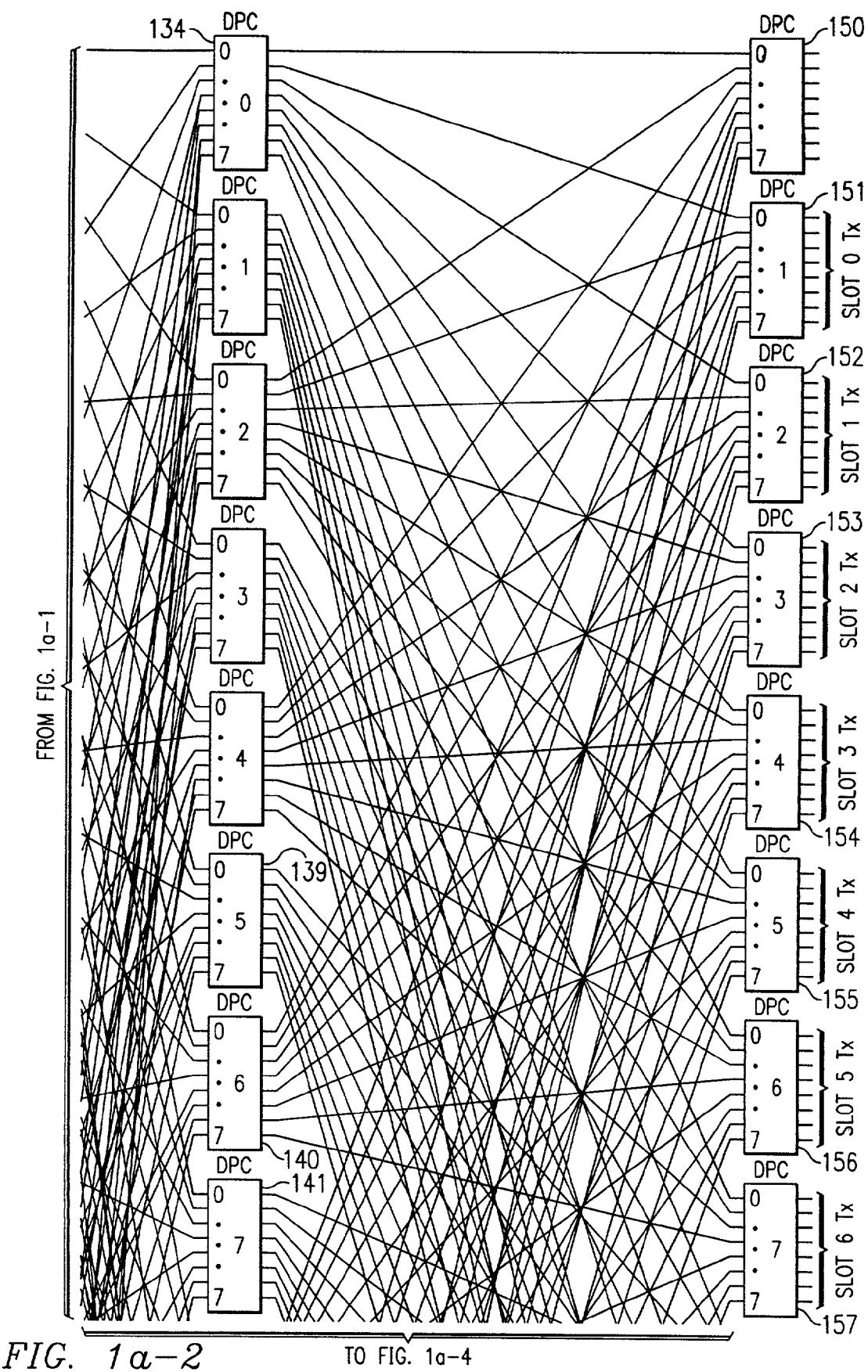

Having described the configuration of an interconnection network 100 as well as the switching elements and links coupling the switching elements, reference is now made to FIG. 2 which illustrates a path conflict within interconnection network 100 of FIGS. 1a and 1b. A fundamental goal of VCI allocation is to ensure that there exists at least as many distinct paths from any one switching element in a first stage to any switching element in a last stage such that every input port of the switching element at a given slot in the interconnection network can reach any output port of the switching element at a given slot in the interconnection network. For example, as shown in FIG. 1a, there exists at least eight distinct paths from switching element 102 in stage A to switching element 150 in stage D such that every input into switching element 102 in stage A can reach every output out of switching element 150 in stage D. Thus, if a data traffic pattern is a permutation of input ports to output ports between, for example, switching elements 202 and 204, paths 206 and 208 may be used to transmit the data traffic at full speed. In addition, the data traffic may be transmitted in parallel if no other data traffic is being transmitted at the same time on a specific path.

As noted above, conflicts may occur when data traffic from input source ports, such as input ports 210 and 212, attempt to use the same physical path through switching element 214 to output destination ports, such as output ports 216 and 218. A conflict implies that data traffic inputs at ports 210 and 212 cannot use the same physical path simultaneously and maintain full bandwidth of the data routing system. The present invention provides a method and system of avoiding such conflicts while maintaining the bandwidth capabilities of the system used to route data. The method can be referred to as a VCI allocation algorithm while the system takes the form of a data routing system that includes the VCI allocation algorithm of the invention.

Figures 1, 1A, 2, 3:
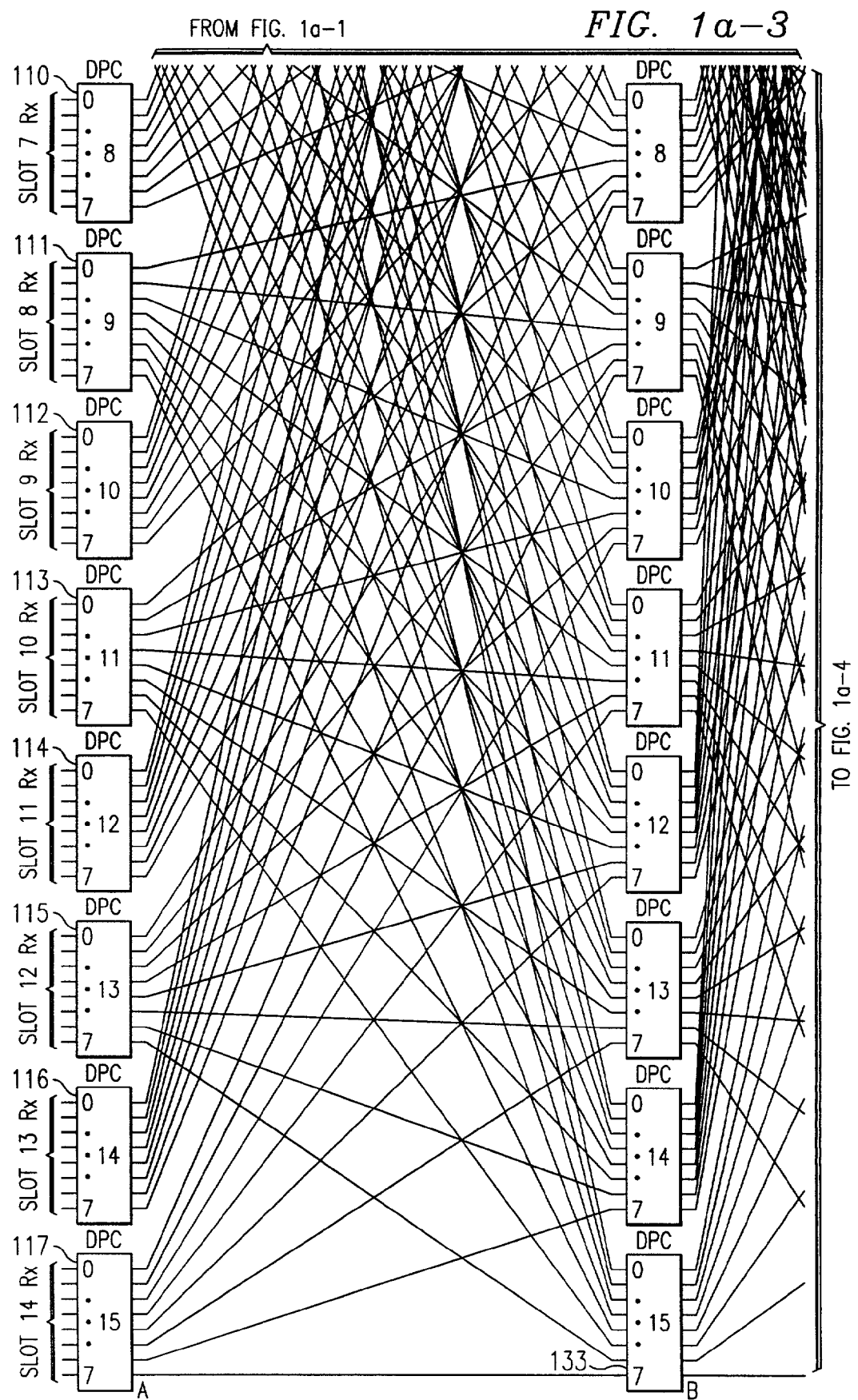
Figure 3:
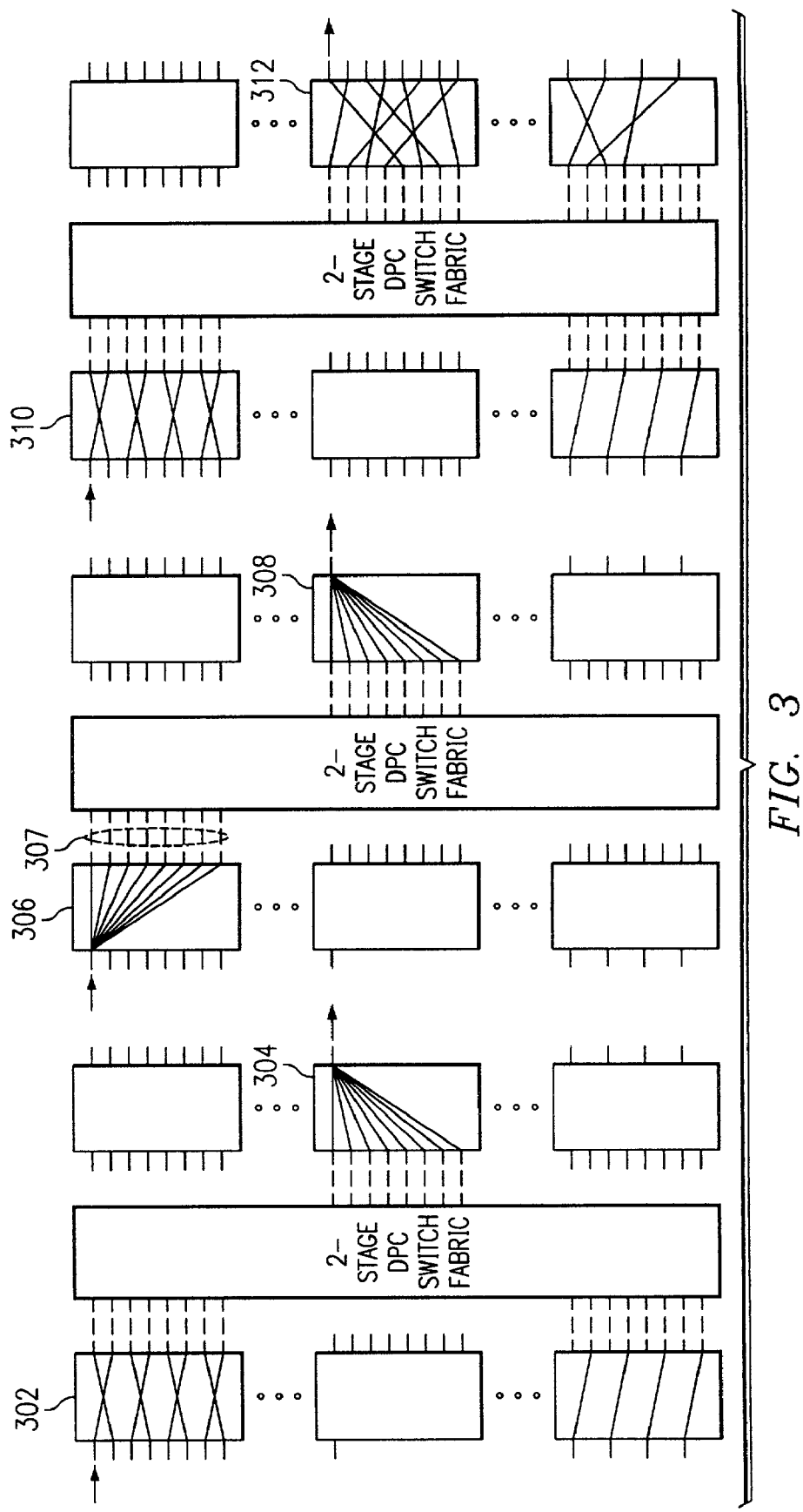
FIG. 3 illustrates different traffic pattern requirements for the interconnection network of FIGS. 1a and 1b.

FIG. 3 illustrates different traffic pattern requirements in the interconnection network 100 of FIGS. 1a and 1b due to the fact that the switching elements in modern-day routers can support both high speed and low speed ports. Therefore, the VCI allocation algorithm of the present invention supports high speed switching element 304 so that a single output port can provide the required speed to support multi-port switching element 302. A multi-port switching element 302 typically consists of two, four, six, or eight ports, although other configurations are possible. Therefore, traffic from the multiple ports of low speed switching element 302 are aggregated into a single high speed switching 304 element in parallel without conflicts. Similarly, traffic from high speed switching element 306 may be deaggregated for input into switching element 308.

To support communications between single port high speed switching elements 306 and 308, data traffic may be split evenly into smaller stripes 307 in a first stage and sent to multiple ports in a second stage. By the use of multiple nonconflict paths which may be preallocated in the interconnection network, data traffic can then be aggregated in a last stage to a desired output port. Also, traffic from low speed switching element 310 may be transmitted in parallel to low speed switching element 312 evenly throughout an interconnection network evenly and without conflicts.

The present invention provides methods and a system for evenly distributing data traffic across an interconnection network such as interconnection network 100, using the full bandwidth of the interconnection network without suffering from the conflict of the data paths when being transmitted from an input point to an output point. Switching elements of differing speeds may be used and still avoid the problem of conflicts and congestion at certain points within the interconnection network experienced by prior art systems. In this regard, the present invention uses the physical restrictions of the interconnection network and logical representations of the interconnection network to setup virtual channel identifiers (VCI) that determine paths through the switching elements and links connecting the switching elements. These VCIs are used to evenly distribute data traffic throughout the interconnection network.

In addition, as illustrated in FIG. 3, the interconnection network may be made up of switching elements of varying speeds, which may include low speed switching elements and high speed switching elements. From a low speed switching element to a high speed switching element, data traffic may be aggregated from multiple inputs into a single output. From a high speed switching element to a low speed switching element, data traffic may be deaggregated from a single input into multiple outputs. From a high speed switching element to another high speed switching element, data traffic may be striped. From a low speed switching element to another low speed switching element, data traffic may be transmitted without any aggregation, deaggregation or striping involved. The networks and system of the present invention support all these traffic patterns in order to balance traffic through the interconnection network.

FIG. 4 is an exemplary flowchart illustrating a method of multi-stage VCI setup in accordance with the present invention. First, a discussion of the environment in which multi-stage VCI setup can be used. Each switching element has an input side, and an output side and each side may contain a plurality of ports. The interconnection network is connected so that an output port of the switching element in a first stage is connected to an input port in a second stage. In addition, a link number which couples the switching elements may be represented by using, for example, seven bits. The first four bits of the seven bits may identify a number associated with a particular switching element and the three remaining bits may identify a port number for the switching element. Thus, an input source link number (consisting of the input switching element and the port of the switching element) may be designated with, for example, seven bits and the output destination link number (consisting of the output switching element and the port of the switching element) may be also designated with, for example, seven bits. For each input/output link pair, a VCI mapping entry at a specific stage may be represented by:

| input: switching element # | input port - input VCI |
| output: switching element # | output port - output VCI |

The architecture of the interconnection network may include some guidelines on the virtual circuit identifier allocation algorithm. Recall, in FIG. 1a, the even switching elements of each stage are connected to the top half of the switching elements in the next stage and the odd switching elements of each stage are connected to the bottom half of the switching elements in the next stage. Therefore, in this example, some preliminary guidelines may be needed to evenly distribute the data traffic across the interconnection network.

Referring back to FIG. 1a, these guidelines may include the following:

For the input side of switching element 102, an even/odd bit of a switching element number associated with switching element 102 in stage A equals a top/bottom bit of a switching element number associated with switching element 118 in stage B. In addition, the remaining bits in the switching element number associated with switching element 102 in stage A equals the bits of an input port number associated with switching element 118 in stage B. Moreover, the bits of the output port of switching element 102 in stage A equals the remaining bits of the switching element number associated with switching element 118 stage b. Finally, the output VCI number for switching element 102 in stage A equals the input VCI number of switching element 118 in stage B.

In this example, the operation begins by setting up the interconnection network virtual circuit identifier (step 402). Then the middle stages of the interconnection network are identified in which a virtual circuit identifier is established (step 404). The switching element interconnection virtual circuit identifier is then set up (step 406). The first stage of the interconnection network is identified in which a virtual circuit identifier is established (step 408) and a last stage of the interconnection network is identified in which a virtual circuit identifier is established (step 410).

FIG. 5 is an exemplary flowchart illustrating the method of virtual circuit identifier set up for a middle stage in accordance with the present invention. In particular, the method of FIG. 5 is a further illustration of step 404 in FIG. 4. In this example, the operation starts by identifying a middle stage switching element in the interconnection network (step 502). An input link coupled to a port in the middle stage switching element is identified (step 504). Then an output link coupled to the port in the middle stage switching element is identified (step 506). A path is selected for the output of the middle stage switching element (step 508). A VCI table entry for an input port and an output port for the middle stage switching element is setup (step 510).

Next, a VCI input number of an input port associated with the middle stage switching element is assigned (step 512). A VCI number of an output port associated with the middle stage switching element assigned (step 514). A determination is then made as to whether or not another port is associated with the middle stage switching element in which a VCI number needs to be assigned (step 516). If another port is associated with the middle stage switching element in which a VCI number needs to be assigned (step 516: YES), the operation returns to step 504 in which an input link to a port in the switching element is identified.

If another port is not associated with the middle stage switching element in which a VCI number needs to be assigned (step 516: NO), a determination is then made as to whether or not there is another middle stage in the interconnection network that has not yet been identified (step 518). If there is not another middle stage in the interconnection network that has not been identified (step 518: NO), the operation terminates. If there is another middle stage in the interconnection network that has not been identified (step 518: NO), the operation returns to step 502 in which a middle stage of the interconnection network is identified.

Figure 6:
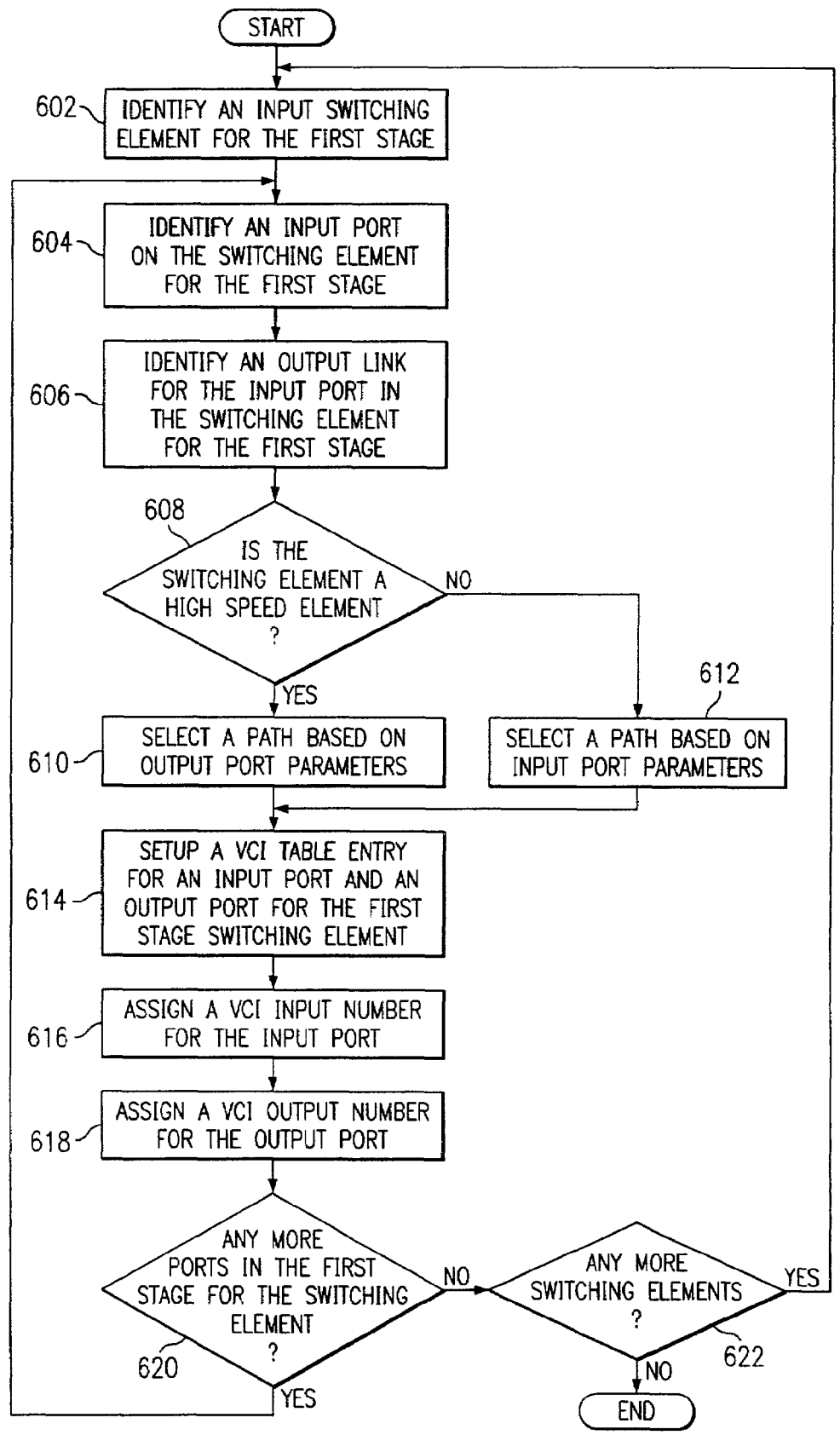
FIG. 6 is an exemplary flowchart illustrating the VCI set up for a first stage in accordance with the present invention.

FIG. 6 is an exemplary flowchart illustrating a method for virtual circuit identifier set up for a first stage in accordance with the present invention. Specifically, FIG. 6 is a further illustration of step 406 of FIG. 4. In this example, the operation starts by identifying a first stage switching element in the interconnection network (step 602). An input port on the switching element for the first stage is identified (step 604). Then an output link coupled to input port on the switching element for the first stage is identified (step 606). A determination is then made as to whether the first stage switching element is a high speed switching element (step 608). If the first stage switching element is a high speed switching element (step 608: YES), a path is selected based on output port parameters (step 610). If the first stage switching element is not a high speed switching element (step 608: NO), the path is selected based on input port parameters (step 612).

Whether the path is selected based on the input port parameters or the output port parameters, the operation then sets up a VCI table entry for an input port and an output port for the first stage switching element (step 614). A VCI input number is assigned for the input port in the VCI table (step 616). A VCI output number is assigned for the output port in the VCI table (step 618). A determination is then made as to whether or not there is another port on the first stage switching element that has not been identified (step 620). If there is not another port on the first stage switching element that has not been identified (step 620: NO), a de termination is made as to whether or not there are any more switching elements in the first stage that have not been identified (step 622). If there are no more switching elements in the first stage that have not been identified (step 622: NO), the operation terminates. If there is another switching element in the first stage that has not been identified (step 622: NO), the operation returns to step 602 in which an input switching element is identified for the first stage. Returning to step 620, if there is another port on the first stage that has not been identified (step 620: YES), the operation returns to step 604 in which an input port on the first stage switching element is identified.

FIG. 7 is an exemplary flowchart illustrating a method for last stage virtual circuit identifier setup in accordance with the present invention. FIG. 7 is a further illustration of step 408 in FIG. 4. In this example, the operation starts by identifying a last stage switching element on the interconnection network (step 702). An output port on the last stage switching element is then identified (step 704). An input link coupled to the output port on the last stage switching element is identified (step 706). A determination is then made as to whether or not the output switching element is a high speed switching element (step 708). If the output switching element is a high speed switching element (step 708: YES), a path is selected based on output port parameters (step 710). If the output switching element is not a high speed switching element (step 708: NO), the path is selected based on input port parameters (step 712).

Whether the path is selected based on input port parameters or output port parameters, the operation then sets up a VCI table entry for the last stage switching element (step 714). A VCI input port number is assigned for the input port (step 716). A VCI output port number is assigned for the output port (step 718). A determination is then made as to whether or not another port remains on the last stage switching element which has not been identified (step 720). If another port does not remain on the last stage switching element which has not been identified (step 720: NO), a determination is made as to whether or not there are any more switching elements on the last stage which have not been identified (step 722). If there are not any more switching elements on the last stage which have not been identified (step 722: NO), the operation terminates. If there are more switching elements on the last stage which have not been identified (step 722: YES), the operation returns to step 702 in which an output switching element is identified for the last stage. Returning to step 720, if there is another port on the last stage switching element which has not been identified (step 720: YES), the operation returns to step 704 in which an output port on the last stage switching element is identified.

FIG. 8 is an exemplary flowchart illustrating the method for a VCI allocation scheme that supports different traffic pattern requirements in accordance with the present invention. In this example, the operation starts with analyzing physical restrictions and layout analysis of the interconnection network (step 802). The layout analysis of the interconnection network, such as interconnection network 100, may include determining the number of switching elements and the number of links coupled to the switching elements. In one embodiment, the physical restrictions are used to arrive at a logical representation of the architecture of the interconnection network. Then a traffic pattern requirement analysis is carried out (step 804). This traffic pattern analysis is used to balance the data traffic through the links coupling the switching elements.

A bit representation and permutation functions are then translated which may dynamically calculate a specific VCI table entry of each switch element for a given source and destination link number in the interconnection network (step 806). The bit representation and permutation function may be a logical representation of the architecture of the interconnection network. A determination is made as to whether or not the different traffic requirements are verified (step 808). If the different traffic requirements are not verified (step 808: NO), the operation returns to step 806 in which a bit representation and permutation functions are translated. If the different traffic requirements are verified (step 808: YES), a switch element VCI is setup in the interconnection network (step 810) and thereafter the operation terminates. The logical representation and the traffic patterns of the interconnection network are used to setup virtual channel identifiers that determine the paths through which the data is routed. The data is routed through the switching elements and the links so that the data traffic is more evenly distributed through the interconnection network.

Additional advantages of the operation illustrated in FIG. 8 is that hot-swapping of switching elements is enabled and many features of different traffic patterns are satisfied. Hot-swapping of switching elements provides that a specific switching element may be replaced by another switching element without powering down the board to which the parts are connected or disturbing data traffic flow. With the use of the present invention, the hot-swapping of switching elements is enabled without causing any interruption in the traffic patterns. In addition, a source link number may be preserved throughout transmission of the data to the destination port. Preservation of the source link number is desired because the destination link is able to determine the source of the traffic in an easy and efficient manner.

FIG. 9 is an exemplary block diagram showing the use of the present invention within a switching network 900. Switching network 900 may include input 902, virtual circuit identification algorithm 904, stage 1 906, stage 2 908, stage n 910 and output 916. In the most general sense, switching network 900 is a system for routing data. Switching network 900 consists of a plurality of switching elements within each stage 906-910 and a plurality of links coupling both the switching elements and the stages for providing a path for routing data. Virtual circuit identification algorithm 904 is in communication with switching network 900 and provides instructions for establishing an even distribution of data traffic through switching network 900. Switching network 900 includes logic 912 for determining the physical restrictions of the network 900. In addition, switching network 900 also includes logic 914 for balancing data traffic through the plurality of links using traffic patterns of the switching network 900.

Therefore, the present invention provides a method and system in which traffic between a source link and a destination link is evenly transmitted between stages in the interconnection network so that no conflict arises between the transmission of data. By the processes of the present invention, no available pathway in the interconnection network is wasted. Data traffic is transmitted evenly along the interconnection network so that one data path does not interfere with transmission of data on another data path. Furthermore, switching elements of various speeds may be used and the data traffic aggregated or deaggregated according to the speed requirements of the switching elements. The present invention provides for a systematic and orderly allocation of data traffic without conflicts and congestion in the interconnection network.

A DETAILED EXAMPLE

Physical restrictions

Recall that all the even DPC's in each stage are connected to the 8 top half DPC in the next stage and all the odd DPCs are connected to the 8 bottom half ones in the next stage. As shown in FIG. 1, the internal link connection architecture imposes some restrictions on the allocation algorithm, which can be translated to bit representation. For example, for the input side, bit 0 (even/odd bit) of the DPC number in STAGE[k] must be equal to bit 3 (top/bottom bit) of the DPC number in STAGE[k+1] for any valid path ("Restriction 1").

Furthermore, the bits 3, 2, 1 of the DPC number in STAGE[k] must equal bits 2, 1, 0 of the INPUT port number in STAGE[k+1] for any valid path ("Restriction 2"). The bits 2, 1, 0 of the DPC number in STAGE[k+1] must equal bits 2, 1, 0 of the OUTPUT port number in STAGE[k] for any valid path ("Restriction 3"). For each connected path, the output VCI in STAGE[i] must be equal to the input VCI in STAGE[i+1].

FIGS. 10(a), (b), (c), (d) show the steps to apply the physical restriction to a specific example algorithm using bit permutation and assignments according to the invention. To simplify the process, the following expressions are used:

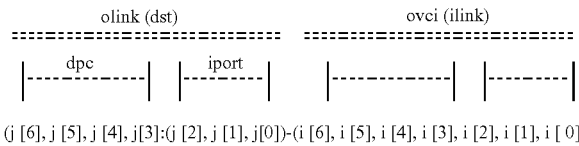

(j[6], j[5], j[4], j[3]:(j[2], j[1], j[0])-(i[6], i[5], i[4], i[3], i[2], i[1], i[0])

as the last stage output side.

Therefore, as shown in FIG. 10(c), for the "input side", the 4 stages can be represented by the expression:

$(i[6], i[5], i[4], i[3])$ : $(i[2], i[1], i[0])$    #stage[0]: first stage ($fs$)

$(i[3], a, b, c)$ : $(i[6], i[5], i[4])$    #stage[1]: middle stage 1 ($ms1$)

$(c, d, e, j[6])$ : $(i[3], a, b)$    #stage[2]: middle stage 2 ($ms2$)

$(j[6], j[5], j[4], j[3])$ : $(c, d, e)$    #stage[3]: last stage ($ls$)

There are 32 possibilities for the (a, b, c, d, e) tuple. That is, given a input/output pair, there are 32 physical paths from an input link to an out put link. As shown in FIG. 10(d), at the "output side" the four stage DCPs can be represent as follows:

STAGE[0]::$fs$ input = $(i[6], i[5], i[4], i[3])$ : $(i[2], i[1], i[0])$ –
$(j[6], j[5], j[4], j[3], j[2], j[1], j[0])$ output = $(i[6], i[5], i[4], i[3])$ : $(a, b, c)$ –

STAGE[1]::$ms2$ input = $(i[3], a, b, c)$ : $(i[6], i[5], i[4])$ – output = $(i[3], a, b, c)$ : $(d, e, j[6])$ –

STAGE[2]::$ms2$ input = $(c, d, e, j[6])$ : $(i[3], a, b)$ – output = $(c, d, e, j[6])$ : $(j[5], j[4], j[3])$ –

STAGE[3]::$ls$ input = $(j[6], j[5], j[4], j[3])$ : $(c, d, e)$ – output = $(j[6], j[5], j[4], j[3])$ : $(j[2], j[1], j[0])$ –
$(i[6], i[5], i[4], i[3], i[2], i[1], i[0])$ With reference to FIG. 10(b), at step 1 we apply physical restrictions 1 and 2 mentioned previously to the middle stage[1] and derive the last bit of the output slot number of the middle stage[2] from j[6], the first bit of the input slot number of the last stage[3], as indicated by arrow 1. Next, at arrow 2 we assign variables a, b, c to the input slot number of the middle stage[1] and derive the same slot number for the same stage.

Next, we apply physical restrictions 1 and 2 mentioned previously again to the middle stage[2] arrow 3. In arrow 4, at the stage[2] output we derive the first bit of the output slot number from the input for the same stage. We then assign variables d, e to the input slot number of the middle stage[2] because a, b, c have already been used in the same line, arrow 5. In the stage[2] output, we derive the same slot number for the input of the same stage, step 6.

At arrow 7, we apply physical restrictions 1 and 2 mentioned previously again to the last stage[3] input and then, at arrow 8 shown in FIG. 10(3), we apply physical restriction 3 mentioned previously to the middle stages' output port.

Because (a, b, c, d, e) value decides one physical path, the question remains how to assign the path (a, b, c, d, e) value and how to chose the output VCI number in each stage.

Additional Requirements

Furthermore, the following additional requirements are placed to make sure that traffic is distributed evenly such that all parts of the fabric are used:

1. Given a pair of slots, at least 3 bits among [a-e] must be varied based on slot numbers. There must be as many different paths through the fabric as the maximum number of ports on either one of the boards. Thus, at least 8 paths must be used for an existing Ethernet board.
2. (a, b, c) cannot just depend on i[2, 1, 0] or j[2, 1, 0]. Because for 4-port boards, the i[2] and/or j[2] will be always zero. For example, if "c" is i[2] or j[2], it will always be fixed for a 4-port board, which cannot lead to a evenly distributed traffic pattern. It would be better to choose "c" based on some bit in slot number, so that half the slots use one set of 16-paths and remaining half use another set of 16-paths through the fabric. For a 1-port board, it also requires that (a,b,c) value can not based on i[2,1,0] because it is always 0.
3. If we want to derive the VCI number uniquely in the range [0-127] on each link, for a given dpc:port pair, all 7 bits (4 for dpcnum and 3 for portnum) should be independent (i.e. no two bits should be dependent on the same variable).
4. In summary, each entry in 14 bits of the input/output side at any stage should be represented as a permutation of the 7 bits of source link number and the 7 bits of the destination link number.

The Final Solution

Recall that for a given i (source link) and j (destination link), the stage[0] and stage[3] DPCs are selected. There are 32 distinct paths between any pair of boards, and we need to select at least 8 good paths with the no-conflict property. There are eight stage[1] possibilities: either the top half or bottom half depending on whether i is odd or even. There are eight stage[2] possibilities: either even or odd depending on whether j is top or bottom half. Consider the two middle stages, looking just at the even four DPCs of stage[1] going to the top four. To avoid conflicts, there must be an one-to-one mapping between these 4 DPCs in stage[1] and 4 DPCs in stage[2]. That is, if we pick up the mapping such that one DPC through a path to a specific DPC in stage[2], the other three cannot choose the same one for stage[2], so there are 4*3*2*1==24 possible non-conflicting selections for the four vcis. Same for the bottom half, and since these are independent, there are 24*24=576 arrangements.

To be able to allocate 8 dis-joined paths between a pair of source board and destination board, the 5-tuple (a, b, c, d, e) has to be able to generate at least 8 different permutations. Hence, we can focus on only 3 out of the 5 bits so exact 8 different values exist. It can start in choosing (a, b, c), of which the output ports of the first stage DPCs will be decided. The value of (d, e) can be chosen afterwards to avoid any conflicts in the 8 paths. Once the value of (a, b, c, d, e) are decided, the input and output ports for all DPCs are decided, and we then can worry about the VCI numbers to satisfy all the requirements mentioned above.

A possible combination which may satisfy the above is to find 8 values for (a, b, c) that can generate all 8 combinations, such as using i[2,1,0] or j[2,1,0] (port numbers of source or destination boards), and then make d equals to b and e equals to a. The 8 different combination can be listed as:

| (a, b, c, d, e) |
|---|
| 0 0 0 0 0 |
| 0 0 1 0 0 |
| 0 1 0 1 0 |
| 0 1 1 1 0 |
| 1 0 0 0 1 |
| 1 0 1 0 1 |
| 1 1 0 1 1 |
| 1 1 1 1 1 |

However, this set of 8 paths cannot avoid the conflicts in the middle stages. We must use 4 sets of 8-path assignment for totally 32 paths to satisfy all the constraints. An example is listed as follows:

| (a, b, c, d, e) | (a, b, c, d, e) | (a, b, c, d, e) | (a, b, c, d, e) |
|---|---|---|---|
| 0 0 0 0 0 | 0 0 0 1 0 | 0 0 0 0 1 | 0 0 0 1 1 |
| 0 0 1 0 0 | 0 0 1 1 0 | 0 0 1 0 1 | 0 0 1 1 1 |
| 0 1 0 0 1 | 0 1 0 1 1 | 0 1 0 0 0 | 0 1 0 1 0 |
| 0 1 1 0 1 | 0 1 1 1 1 | 0 1 1 0 0 | 0 1 1 1 0 |
| 1 0 0 1 0 | 1 0 0 0 0 | 1 0 0 1 1 | 1 0 0 0 1 |
| 1 0 1 1 0 | 1 0 1 0 0 | 1 0 1 1 1 | 1 0 1 0 1 |
| 1 1 0 1 1 | 1 1 0 0 1 | 1 1 0 1 0 | 1 1 0 0 0 |
| 1 1 1 1 1 | 1 1 1 0 1 | 1 1 1 1 0 | 1 1 1 0 0 |

Presenting each path in magic number formed by 5-bit integer, the 8-path set array is as follows.

$$(a, b, c, d, e) = \{\{0, 4, 9, 13, 18, 22, 27, 31\},$$
$$\{2, 6, 11, 15, 16, 20, 25, 29\},$$
$$\{1, 5, 10, 14, 19, 23, 24, 28\},$$
$$\{3, 7, 8, 12, 17, 21, 26, 30\}\}$$

Each row acts as one 8-path selection. Now, we need to use 3 bits among 14 bits (i[6 ... 0]:j[6 ... 0]) to select (a, b, c) and use another 2 bits to select the desired path set, e.g., use some bits in input or output DPC number (i.e., slot number) to choose which set of those 4 sets. To be able to satisfy the striping requirement, the choice of (a, b, c) as either i[2,1,0] or j[2,1,0] will depend on the type of the boards. And (d, e) can be calculated based on (a, b) but they have also to consume 2 bits to from i and j to avoid conflicts. We chose to use exclusive-OR operation with slot number to satisfy this. The choice of (a, b, c, d, e) now is as follows:

$$\text{path } (a, b, c, d, e) = (i[2],$$

$$i[1],$$
$$i[0],$$
$$i[1]\wedge i[4],$$
$$i[2]\wedge i[5]);$$

Furthermore, in order to evenly distribute the traffic for both low-and high-speed boards, j[5] and j[4] are added as the factors to a, b such that given a output slot, the VCI and port number of that traffic will be different from the traffic to the other output slots. For normal boards, the final path selection we use is as follows:

$$\text{path } (a, b, c, d, e) = (i[2]\wedge j[5],$$
$$i[1]\wedge j[4],$$
$$i[0]\wedge j[6]\wedge j[3]\wedge i[6]\wedge i[3],$$
$$i[1]\wedge i[4],$$
$$i[2]\wedge i[5]);$$

and for High-speed 1-port boards with striping support, because i[2,1,0] is always 0, we need to use j[2,1,0] instead to choose 8 paths. Thus:

$$\text{path\_hs } (a, b, c, d, e) = (j[2]\wedge j[5],$$
$$j[1]\wedge j[4],$$
$$j[0]\wedge j[6]\wedge j[3]\wedge i[6]\wedge i[3],$$
$$j[1]\wedge i[4],$$
$$j[2]\wedge i[5]);$$

To make board changes have no impact on the VCI allocation on the fabric, a fully mesh allocation of VCIs for all the links are performed in the two middle stages. The final step is to choose the 7-bit VCI numbers. As described earlier, we should exhaust all bits from i and j, hence we just used the remaining 7 bits out from the bits used by slot and DPC numbers. The final VCI allocation scheme used for specific router, such as the Ericsson AXI540 router, is described as follows:

STAGE[0]::*fs* input = (i[6], i[5], i[4], i[3]) : (i[2], i[1], i[0]) –
(j[6], j[5], j[4], j[3], j[2], j[1], j[0])

output = (i[6], i[5], i[4], i[3]) : (a, b, c) –
(j[6], j[5], j[4], j[3], j[2], j[1], j[0])

STAGE[1]::*ms1* input = (i[3], a, b, c) : (i[6], i[5], i[4]) –
(j[6], j[5], j[4], j[3], j[2], j[1], j[0])

output = (i[3], a, b, c) : (d, e, j[6]) –
(i[6], i[5], i[4], j[3], j[2], j[1], j[0])

STAGE[2]::*ms2* input = (c, d, e, j[6]) : (i[3], a, b) –
(i[6], i[5], i[4], j[3], j[2], j[1], j[0])

-continued output = $(c, d, e, j[6]) : (j[5], j[4], j[3])$ –
$(i[6], i[5], i[4], i[3], i[2], j[1], j[0])$ STAGE[3]:$ls$ input = $(j[6], j[5], j[4], j[3]) : (c, d, e)$ –
$(i[6], i[5], i[4], i[3], i[2], j[1], j[0])$ output = $(j[6], j[5], j[4], j[3]) : (j[2], j[1], j[0])$ –
$(i[6], i[5], i[4], i[3], i[2], i[1], i[0])$ Here the last 3 bits of VCI numbers are always j[2, 1, 0] except the output VCI in the last stage, which is using i[2, 1, 0]. The rest bits of VCI number are using most from the output slot number. So given a output slot the VCI number of that traffic will be different from the traffic to the other output slots. In addition, the output VCI number in the last stage is "i", the source link number, which allows the destination link to be able to tell the source of the traffic easily.

Figure 13:
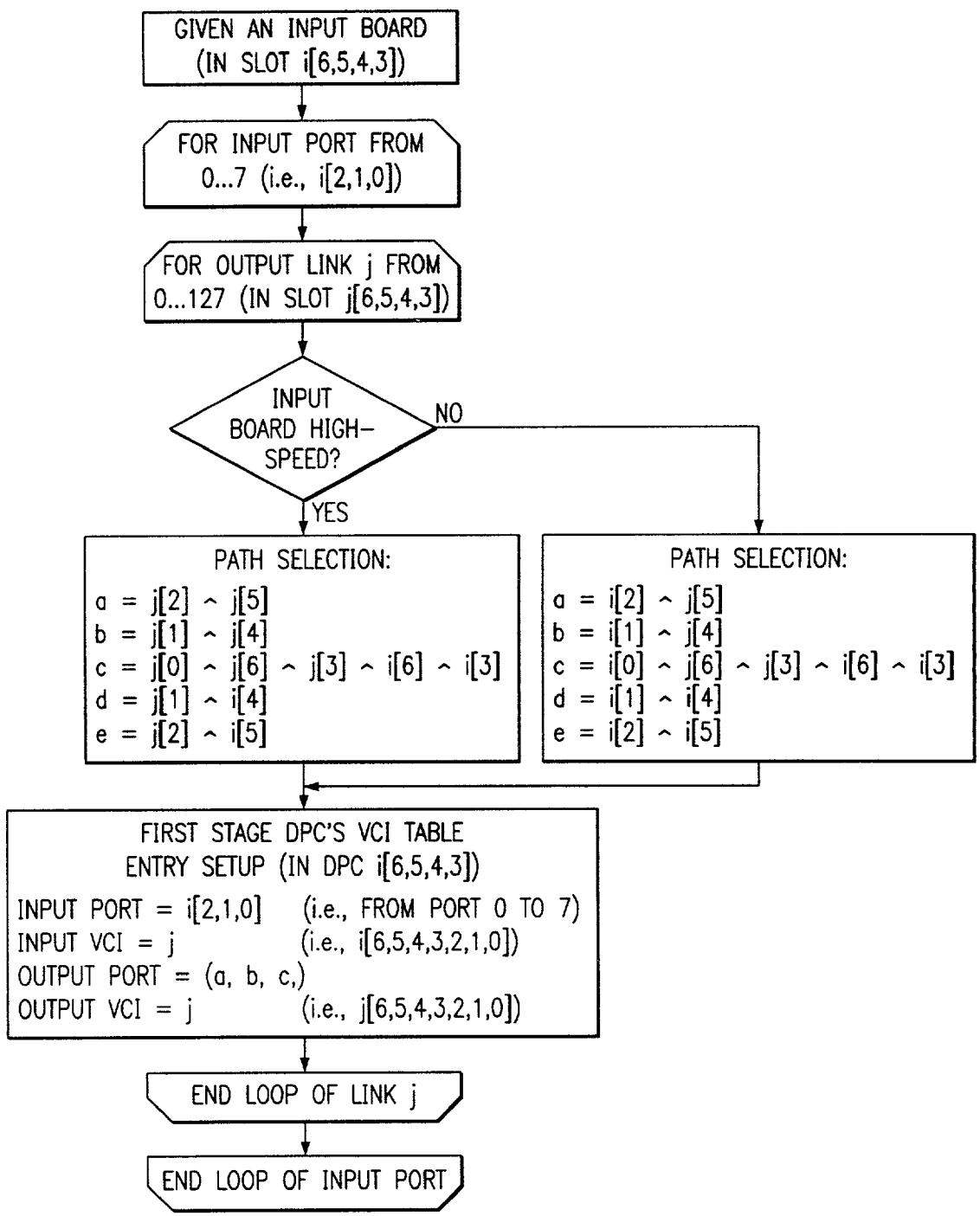
Figure 14:
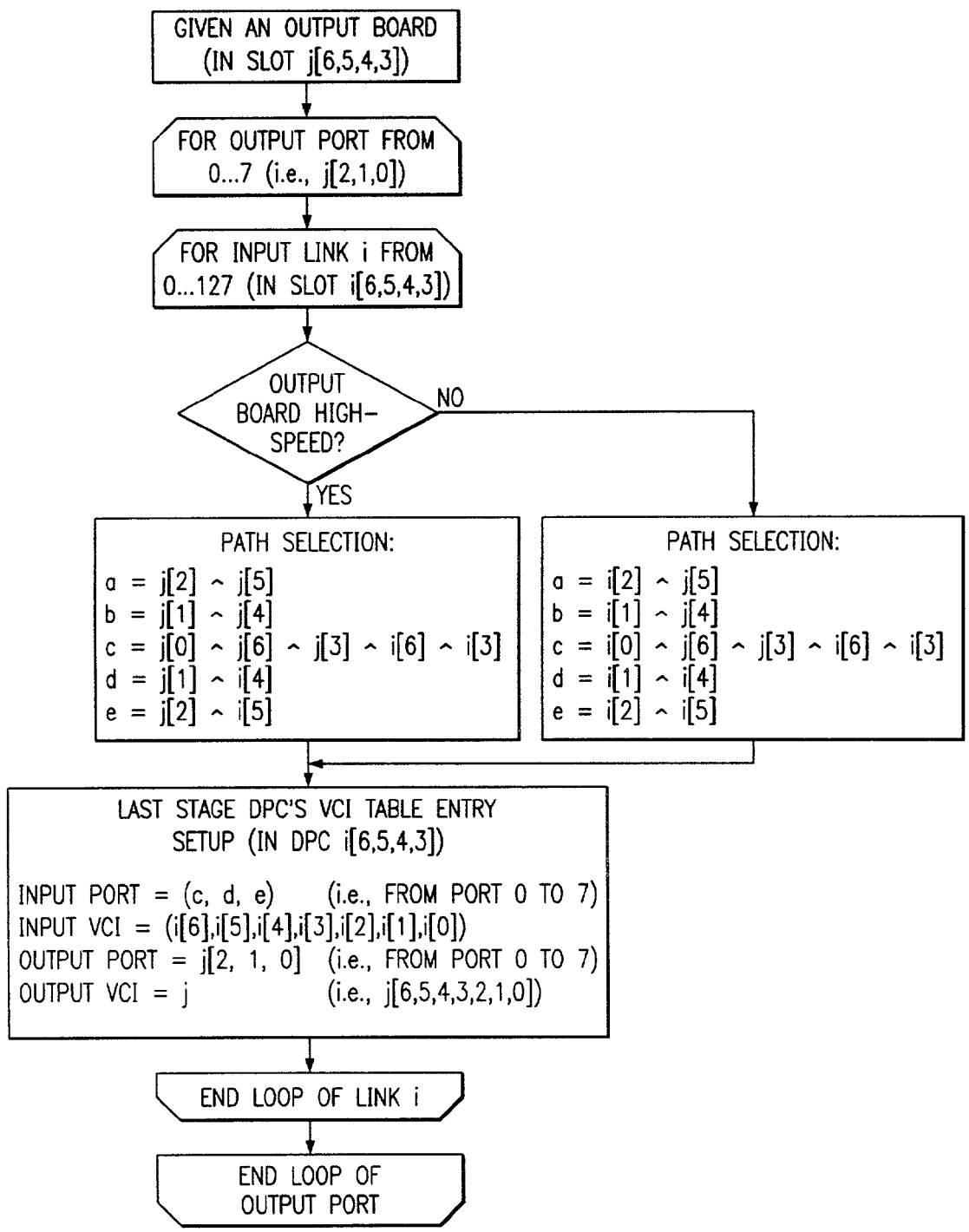

FIG. 11 illustrates the VCI setup algorithm applied to our a specific router, such as the Ericsson AXI 540 router. FIGS. 12, 13, and 14 show the VCI setup process of the present invention in different stages. Initially, we place 4 bits as (i:j) in the first stage input and (j:i) in the last stage output. Because the slot numbers (or dpc number) remain the same in the same stage, we also put them in the first stage output and the last stage input.

The embodiments shown and described above are only exemplary. Even though numerous characteristics and advantages of the present inventions have been set forth in the foregoing description, together with details of the structure and function of the invention, the disclosure is illustrative only, and changes may be made within the principles of the invention to the full extent indicated by the broad general meaning of the terms used in the attached claims.

What is claimed is:

1. A method of assigning paths through an interconnection network consisting of a plurality of switching elements and a plurality of links coupling the switching elements, the method comprising the steps of:
    determining physical restrictions of the interconnection network, the physical restrictions including a configuration and type of switching elements and links coupling the switching elements in the interconnection network;
    responsive to the determined physical restrictions of the interconnection network, determining a logical representation of an architecture of the interconnection network;
    determining traffic patterns of the interconnection network to balance the data traffic through the links coupling the switching elements; and
    using the logical representation and traffic patterns of the interconnection network to setup virtual channel identifiers that determine paths through the switching elements and links so that data traffic is more evenly distributed through the interconnection network.

2. The method according to claim 1, wherein the physical restrictions are based on a speed of the switching element.

3. The method according to claim 1, wherein the physical restrictions are based on a configuration of the interconnection network.

4. The method according to claim 1, wherein the physical restrictions are based on a number of stages in the interconnection network.

5. The method according to claim 4, wherein the number of stages is four in the interconnection network.

6. The method according to claim 4, wherein the physical restrictions are further based on a number of switching elements in each stage in the interconnection network.

7. The method according to claim 6, wherein the number of switching elements in each stage in the interconnection network is sixteen.

8. The method according to claim 1, wherein the physical restrictions are based on a number of ports for each switching element in the interconnection network.

9. The method according to claim 1, wherein the logical representation of the architecture of the interconnection network is a bit representation of the interconnection network.

10. The method according to claim 1, wherein the logical representation of the architecture of the interconnection network is a permutation function of the architecture of the interconnection network.

11. The method according to claim 1, wherein the traffic patterns of the interconnection network are balanced through switching elements of different speeds.

12. The method according to claim 1, wherein the virtual circuit identifiers identify a source link identifier for the paths through the switching elements.

13. The method according to claim 12, wherein the source link identifier includes a switching element identifier and an input port identifier.

14. The method according to claim 1, wherein the virtual circuit identifiers identify a destination link identifier for the paths through the switching elements.

15. The method according to claim 14, wherein the destination link identifier includes a switching element identifier and an output port identifier.

16. A method of assigning paths through an interconnection network consisting of a plurality of switching elements and a plurality of links coupling the switching elements, the method comprising the steps of:
    determining physical restrictions of the interconnection network, the physical restrictions including a configuration and type of switching elements and links coupling the switching elements in the interconnection network;
    responsive to the determined physical restrictions of the interconnection network, mapping the interconnection network with a virtual circuit identifier, the virtual circuit identifier based on the physical restrictions and traffic patterns of the network; and
    using the virtual circuit identifier to assign a path for data through the interconnection network from an input port to an output port.

17. The method according to claim 16, wherein the physical restrictions are based on a speed of a switching element in the network.

18. The method according to claim 16, wherein the physical restrictions are based on a configuration of the interconnection network.

19. The method according to claim 16, wherein the physical restrictions are based on a number of stages in the interconnection network.

20. The method according to claim 19, wherein the number of stages is four in the interconnection network.

21. The method according to claim 19, wherein the physical restrictions are further based on the number of switching elements in each stage in the interconnection network.

22. The method according to claim 21, wherein the number of elements in each stage in the interconnection network is sixteen.

23. The method according to claim 16, wherein the physical restrictions are based on a number of ports for each switching element in the interconnection network.

24. The method according to claim 16, wherein the logical representation of the architecture of the interconnection network is a bit representation of the interconnection network.

25. The method according to claim 16, wherein the logical representation of the architecture of the interconnection network is a permutation function of the architecture of the interconnection network.

26. The method according to claim 16, wherein the virtual circuit identifier identifies a source link identifier for a path through a switching element.

27. The method according to claim 26, wherein the source link identifier includes a switching element identifier and the input port identifier in the switching element.

28. The method according to claim 16, wherein the virtual circuit identifier identifies a destination link identifier for a path through a switching element.

29. The method according to claim 28, wherein the destination link identifier includes a switching element identifier and an output port identifier in the switching element.

30. A system for routing data, comprising:

a switching network including a plurality of switching elements and plurality of links coupled to the switching elements for providing a routing path for the data;

means for determining physical restrictions of the interconnection network, the physical restrictions including a configuration and type of switching elements and links coupling the switching elements in the interconnection network;

a virtual circuit identification algorithm in communication with the switching network for providing an even distribution of data traffic through the switching network, the virtual circuit identification algorithm being responsive to the determined physical restrictions of the interconnection network.

31. The system according to claim 30, wherein the switching elements are grouped into a number of stages.

32. The system according to claim 30, wherein the switching network further comprises a logic unit for determining the physical restrictions of the switching network.

33. The system according to claim 30, wherein the switching network further comprises logic for balancing data traffic through the plurality of links using traffic patterns of the switching network.

* * * * *

UNITED STATES PATENT AND TRADEMARK OFFICE
CERTIFICATE OF CORRECTION

PATENT NO.        : 7,336,658 B2
APPLICATION NO. : 10/033039
DATED             : February 26, 2008
INVENTOR(S)       : Chang et al.

Page 1 of 1

It is certified that error appears in the above-identified patent and that said Letters Patent is hereby corrected as shown below:

On the Title Page Item (75), under "Inventors", Line 3, delete "Rockville," and insert -- Gaithersburg, --, therefor.

On the Title Page Item (75), under "Inventors", Line 4, delete "Rockville," and insert -- Bethesda, --, therefor.

Signed and Sealed this

Seventh Day of October, 2008

JON W. DUDAS
*Director of the United States Patent and Trademark Office*